United States Patent [19]

Litzinger

[11] E Re. 28,858

[45] Reissued June 15, 1976

[54] SELECTIVE GAS PHASE FILTER MATERIAL

[75] Inventor: Elmer Francis Litzinger, Louisville, Ky.

[73] Assignee: Brown & Williamson Tobacco Corporation, Louisville, Ky.

[22] Filed: Feb. 7, 1975

[21] Appl. No.: 547,977

Related U.S. Patent Documents

Reissue of:

[64] Patent No.: 3,716,063
Issued: Feb. 13, 1973
Appl. No.: 75,773
Filed: Sept. 25, 1970

[52] U.S. Cl. ..... 131/267; 131/10 R

[51] Int. Cl.[2] ..... A24B 15/02; A24F 7/04; B01D 27/00

[58] Field of Search ..... 131/10 R, 10.9, 265, 131/267, 269

[56] References Cited

UNITED STATES PATENTS

| | | | |
|---|---|---|---|
| 2,815,760 | 12/1957 | Schreus et al. | 131/267 X |
| 3,340,879 | 9/1967 | Horsewell et al. | 131/269 X |
| 3,410,282 | 11/1968 | Walker et al. | 131/267 |
| 3,429,318 | 2/1969 | Walker et al. | 131/267 |
| 3,434,479 | 3/1969 | Till et al. | 131/10.9 |

FOREIGN PATENTS OR APPLICATIONS

| | | | |
|---|---|---|---|
| 716,358 | 8/1965 | Canada | 131/267 |
| 837,888 | 3/1970 | Canada | 131/267 |
| 813,119 | 5/1969 | Canada | 131/267 |
| 857,972 | 12/1970 | Canada | 131/267 |
| 359,459 | 7/1930 | Canada | 131/267 |
| 108,225 | 10/1967 | Denmark | 131/267 |
| 1,528,262 | 6/1968 | France | 131/267 |
| 264,568 | 2/1968 | Sweden | 131/267 |
| 302,737 | 12/1963 | Sweden | 131/267 |
| 304,209 | 8/1964 | Sweden | 131/267 |
| 1,134,030 | 11/1968 | United Kingdom | 131/267 |
| 1,138,816 | 1/1969 | United Kingdom | 131/267 |

*Primary Examiner*—Robert W. Michell
*Assistant Examiner*—V. Millin
*Attorney, Agent, or Firm*—Finnegan, Henderson Farabow & Garrett

[57] ABSTRACT

An improved tobacco smoke filter material is formed from a porous particulate carrier impregnated with an additive having an affinity for volatile smoke acids and aldehydes, such as buffered polyethyleneimine, wherein the carrier particles have a pore diameter from 0.1 to 2.0 microns, a surface area of from about 1 to 15 square meters per gram, and a pore volume no less than about 0.3 cubic centimeter per gram.

12 Claims, No Drawings

SELECTIVE GAS PHASE FILTER MATERIAL

Matter enclosed in heavy brackets [ ] appears in the original patent but forms no part of this reissue specification; matter printed in italics indicates the additions made by reissue.

This application is related to co-pending application Ser. No. 75,772, filed Sept. 25, 1970, *now U.S. Pat. No. 3,716,500.*

BACKGROUND OF THE INVENTION

The invention is related to a tobacco smoke filter material. In particular, it is related to a porous particulate material for selectively removing smoke acids and aldehydes. Hitherto, it has been proposed to disperse various materials, such as amines and/or amine salts, on conventional filter tows (see U.S. Pat. No. 3,410,282) to selectively remove smoke acids from tobacco smoke. Similarly, it has been proposed in U.S. Pat. No. 3,340,879 to treat conventional filter tow with a poly(alkyleneimine) to selectively remove smoke acids while allowing a major proportion of the flavorants to pass. Additionally, it has been proposed in U.S. Pat. No. 2,815,760 to adsorb specified amines on certain porous granules of unspecified pore diameter, surface area and pore volume to reduce volatile tobacco smoke components.

However, the aforesaid additives have not yielded satisfactory selective removal of such smoke phase components, as smoke aldehydes, particularly acetaldehyde and acrolein. As employed in this application, the term "filter material" refers to a porous particulate carrier impregnated with an additive of the invention. The term "additive" is applied to a moiety impregnated on the carrier with an affinity for volatile smoke acids and aldehydes.

SUMMARY OF THE INVENTION

It is, therefore, a primary object of the present invention to overcome the difficulties and disadvantages heretofore encountered and to provide an improved filter material for delivering to the mouth of the smoker a smoke stream of the desired composition having the desired organoleptic characteristics and from which selected volatile components have been removed, such as vapor phase aldehydes, while leaving in the smoke desired flavor or aroma imparting materials.

The above and other beneficial objects and advantages are obtained in accordance with the present invention by an improved tobacco smoke filter material which comprises a porous particulate carrier impregnated with an additive having an affinity for volatile smoke acids and aldehydes, wherein each of the said carrier particles has a pore diameter of from about 0.1 to 2.0 microns, a surface area of from about 1 to 15 square meters per gram and a pore volume no less than about 0.3 cubic centimeter per gram. It has been found that buffered poly(alkyleneimines) supported on a porous alumina substrate having the aforesaid physical characteristics provide highly efficient filter materials for the selective removal of volatile aldehydes, such as acetaldehyde and acrolein, from cigarette smoke. Such materials also retain their normal affinity for smoke acids.

The physical parameters of the substrate material are of critical importance. In order to provide substantial reductions of vapor phase aldehydes, for example, it is necessary that the average pore diameter (assuming cylindrical pores) of the substrate material be from about 0.1 to 2.0 microns.

In order to achieve satisfactory loadings of additive on the substrate, the pore volume of the substrate should be no less than about 0.3 cubic centimeter per gram (cc/gm). Below this level selective removal of smoke stream acids and, particularly, aldehydes is significantly diminished. While applicant does not wish to be bound to any particular theory, it is nevertheless postulated that as increasing amounts of additive are deposited on the substrate, pore filling occurs. To overcome this defect, it has been found that the porous carrier should have a pore volume of no less than 0.3 cubic centimeter per gram, when sufficient loadings of additive are incorporated on the carrier to effectively reduce smoke acids and aldehydes.

Porous carriers with the above pore sizes and pore volumes have surface areas in the range from about 1 to 15 square meters per gram ($m^2/gm$). This is to be contrasted with conventional commercial adsorbent materials with surface areas of greater than 200 square meters per gram. Such commercial materials have been found to be relatively poor substrates for the additive described herein.

DESCRIPTION OF THE PREFERRED EMBODIMENTS

The additive employed should have an affinity for volatile acids and aldehydes entrained in a tobacco smoke stream. The additive may be an amine at least partially buffered by a carboxylic acid. The carboxylic acid salts are prepared by reacting primary or secondary alkyl and hydroxyalkyl amines with the acid. Some amines which have been found particularly effective include: ethylamine, dibutylamine, ethylenediamine, ethanolamine and the like. The acids used in the preparation of the amine salts can be aliphatic or aromatic mono- or polycarboxylic acids including the following: acetic, itaconic, lactic, succinic, benzoic and cinnamic acids.

Other carbonyl reactive materials which may be employed as additives include phenylhydrazine, semicarbazide, thiosemicarbazide and the like.

The porous carrier for the additive can be any solid substrate capable of supporting the additive provided that the carrier has the previously specified dimensional parameters. In general, organic and inorganic materials may be employed. Typical carriers, also referred to herein as substrates, include: magnesite, zeolites, fuller's earth diatomaceous earth, polyethylene granules, silica gel, and the like.

Examples of the filter material of the invention are produced by at least partially neutralizing each of the following organic bases with any of the following acids and, thereafter, depositing the buffered additive on any of the following substrates:

| Organic Base | Acid | Porous Substrate |
|---|---|---|
| diethylamine | acetic | polyethylene |
| octylamine | propionic | polypropylene |
| diethylenetriamine | lactic | magnesite |
| tetraethylenepentamine | glycolic | |
| benzylamine | | |
| ethanolamine | malonic | fuller's earth |
| | succinic | |
| 2-amino-2-methyl-1-propanol | glutaric | |
| poly(2-ethylaziridine) | benzoic | molecular sieves |

-continued

| Organic Base | Acid | Porous Substrate |
|---|---|---|
| poly(2,2-dimethyl-3-n-propylaziridine) | anisic | diatomaceous earth |

The porous substrates each have a pore diameter from about 0.1 to 2.0 microns, a pore volume no less than about 0.3 cubic centimeter per gram and a surface area of from about 1 to 15 square meters per gram.

A synergistic interaction resulting in unexpectedly enhanced reductions of vapor phase aldehydes has been observed with at least the preferred filter materials as described hereinafter. Reductions in aldehydes, for example, significantly greater than that expected from the additive effects of the porous carrier and the additive, have been obtained.

Enhanced results are obtained with and, accordingly, it is preferred to employ at least partially buffered poly(alkyleneimines) as an additive for the substrate. Preferred poly(alkyleneimines) are disclosed in U.S. Pat. No. 3,340,879 and, accordingly, the disclosure of the aforesaid patent is expressly incorporated herein. The poly(alkyleneimines) are at least partially neutralized or buffered with a carboxylic acid. Generally, alkanoic acids are preferred for this purpose.

For best results, poly(ethyleneimine), at least partially buffered with acetic acid, is employed.

When acid-buffered filter material is employed, aldehyde filtration efficiency is generally acceptable, as long as the pH range of the additive is between about 6.0 and 7.6. In the case of the highly preferred additive, poly(ethyleneimine) buffered with acetic acid, it has been found that the optimum pH is 7.4.

Enhanced results are obtained with and, accordingly, it is preferred to employ a particulate porous alumina as the substrate for the additive of the invention. A particularly preferred alumina is produced by calcining the trihydrate at high temperatures (usually between about 1,100° to 1,300° Centigrade).

The particularly preferred filter materials of the invention are formed by buffering to a pH in the range from about 6.0 to 7.6 any of the following poly(alkyleneimines) having the general formula:

$$NH_2(CR_2CR_2NH)_nH$$

where each R is individually selected from the class consisting of hydrogen, lower alkyl radicals free from aliphatic unsaturation and having from one to six carbon atoms and n is a whole number greater than 12, with any one of the following alkanoic acids and then combining the buffered additive with a porous alumina:

Porous Alumina

| poly(alkyleneimine) | Alkanoic Acid | Calcine Temp. (degrees Cent. | Surface Area m²/gm) | Pore Vol. (cc/gm) | Pore Diameter (microns) |
|---|---|---|---|---|---|
| poly(ethyleneimine) | acetic | 1300 | 4.4 | 0.4 | 0.2 |
| poly(propyleneimine) | butyric | 1100 | 1.5 | 0.5 | 1.0 |
| poly(2-ethylaziridine) | valeric | 1300 | 1.1 | 0.4 | 1.1 |

Porous Alumina-continued

| poly(alkyleneimine) | Alkanoic Acid | Calcine Temp. (degrees Cent. | Surface Area m²/gm) | Pore Vol. (cc/gm) | Pore Diameter (microns) |
|---|---|---|---|---|---|
| poly(2,2-dimethylaziridine | caproic | | | | |
| poly(2,2-dimethyl-3-n-propylaziridine) | glutaric | | | | |
| | succinic | | | | |

Generally, for effective selective treatment of tobacco smoke according to the invention, at least about 2 percent by weight of additive based on the weight of the carrier is deposited on the carrier. Usually no more than about 6 percent by weight of additive is employed. Increasing the loading of additive has the effect of filling the pores of the carrier, thereby reducing selective removal of smoke stream components.

In the case of the preferred poly(alkyleneimines) buffered with alkanoic acids to a pH in the range from 6.0 to 7.6 and deposited on a porous alumina substrate of the invention, it has been found that from 4 to 6 percent by weight buffered poly(alkyleneimines) yields enhanced results.

The buffered additives are deposited on the above porous substrates by conventional techniques, for example, by immersing the carrier in the solution in which the additive has been prepared and, thereafter, evaporating the solvent. The substrate is then dried and formed into a filter.

Alternatively the filter material can be made in situ by at least partially neutralizing one of the above compounds with one of the above acids in the presence of a porous carrier.

In general, sufficient quantities of the filter material of the invention are employed in smoking articles to significantly reduce the quantity of volatile components normally present in tobacco smoke and, particularly, hydrogen cyanide, acetaldehyde and acrolein. For this and other purposes, it is preferred to employ from about 100 to 150 milligrams of filter material in a filter for use in smoking articles, such as cigarettes.

In one embodiment, a filter is prepared by encasing the filter material of the invention in an outer wrapper. The resulting filter may be employed alone or in combination with conventional cellulose acetate filters. Triple filters employing, sequentially, the following filter sections: cellulose acetate, the filter material of the invention and cellulose acetate, have proven particularly workable. The filter material may be used in conjunction with perforated cigarette paper, if desired, or filter ventilation means may be employed. In another embodiment, the filter material may be dispersed, in granular form, either on paper or cellulose acetate tow and encased in an outer wrapper.

The following examples are provided to further illustrate the nature of the invention and are not limitative of scope.

EXAMPLE I

In order to illustrate the effectiveness of the filter material of the invention, an additive was prepared by buffering poly(ethyleneimine) with acetic acid to pH of 7.4. The amount of acetic acid used for this adjustment was 1.5 milliequivalents of acid per gram of poly(ethyleneimine).

The resulting buffered additive was deposited on selected porous aluminas. Their physical characteristics are set forth in the following table:

Physical Properties of Porous Aluminas

| Sample | Calcine Temp. (degrees Cent. | Surface Area ($m^2$/gm) | Pore Volume (cc/gm) | Pore Diameter (microns) |
|---|---|---|---|---|
| A. | 1300 | 4.4 | 0.4 | 0.2 |
| B. | 1100 | 1.5 | 0.5 | 1.0 |
| C. | 1300 | 1.1 | 0.4 | 1.1 |

For sample A, 5 percent by weight of the buffered additive was deposited on the porous alumina substrate. Filter material was prepared from sample B by depositing, respectively, 2 and 5 percent by weight of the additive on the porous alumina. For sample C, 2 percent by weight of additive was deposited on the porous alumina.

Predetermined quantities of the filter material were packed into 8 millimeter cavities between 7 and 6 millimeter lengths of conventional cellulose acetate filters of 84 millimeter cigarettes (tobacco sections 63 millimeters in length). The resulting cigarettes were smoked to 28 millimeter butt lengths on a constant vacuum smoking machine taking 35 milliliter puffs of 2 seconds duration at one minute intervals.

In the following table, the weight of the filter material is expressed in milligrams. The filter efficiency represents the weight percent of component trapped by the filter materials based on the total amount of the component entering the cigarette filter.

SELECTIVE FILTRATION EFFICIENCIES

| Sample | Quantity Additive on alumina | wt. of Filter Material | Filtration Hydrogen cyanide | Acetaldehyde | Acrolein |
|---|---|---|---|---|---|
| A. | 5% | 270 | 85 | 64 | 67 |
| B. | 2% | 334 | 73 | 44 | 49 |
| B. | 5% | 321 | 79 | 66 | 61 |
| C. | 2% | 339 | 72 | 45 | 35 |

The above table illustrates the efficiency with which volatile components, particularly aldehydic components, are removed from tobacco smoke, employing the filter materials of the invention. Similar results are obtained when other additives having an affinity for volatile vapor phase acids and aldehydes are deposited upon porous particulate carriers, wherein the carrier particles have a pore diameter of from about 0.1 to 2.0 microns, a surface area from about 1 to 15 square meters per gram and a pore volume no less than about 0.3 cubic centimeters per gram.

In the following table any of the additive materials having an affinity for vapor phase acids and aldehydes may be deposited upon any of the porous carriers having the aforesaid physical characteristics to form the filter material of the invention, with similar results.

| Additive | Porous Carrier |
|---|---|
| triethylene tetramine buffered with carboxymethyl cellulose | magnesite polyethylene molecular sieves |
| ethylenediamine buffered with polymethacrylic acid | fuller's earth |

-continued

| Additive | Porous Carrier |
|---|---|
| 2-amino-2-methyl-1-propanol buffered with lactic acid | |

EXAMPLE II

The effect of different loadings of filter material on vapor phase acids and aldehydes was examined by depositing 5 percent by weight, polyethyleneimine-acetate buffered, on a porous alumina substrate and diluting the resulting material with untreated alumina in a 13 millimeter filter bed joined with an 8 millimeter cellulose acetate filter. The dual filter was joined to a tobacco cylinder and tested according to the procedure of Example I.

The results set forth in the following table illustrate filter efficiencies of four different porous aluminas, each deposited with 5 percent by weight of the above additive, wherein the mean pore diameter of the alumina carriers was in the range of from 0.1 to 1.8 microns. Pore volume and surface area were within the critical ranges.

Effect of Additive Loading on Filter Efficiency

| Treated alumina-weight (milligrams) | Hydrogen Cyanide (% removed) | Acetaldehyde (% removed) | Acrolein (% removed) |
|---|---|---|---|
| 50 | 56–63 | 0–15 | 16–28 |
| 100 | 60–71 | 21–34 | 33–38 |
| 150 | 65–77 | 33–47 | 41–46 |

As is evident from the above table, for substantial aldehyde reductions, at least about 100 milligrams of treated carrier per filter are required. Similar results are obtained for other additives deposited on the porous carriers described herein.

COMPARATIVE EXAMPLE I

In order to demonstrate the critical importance of pore diameter, pore volume and surface area to the filter material of the invention, varying quantities of acetate buffered poly(ethyleneimine) were deposited on porous alumina substrates according to the procedure of Example I. The resulting filter material was formed into triple filters and tested according to the procedure set forth in Example I.

Effects of Pore Size on Filtration Efficiency

PORE DIAMETER

| Weight of Additive on Alumina | Pore Volume (cc/gm) | Pore Diameter (microns) | Acetaldehyde removed |
|---|---|---|---|
| 2% | 0.5 | 0.015 | 27% |
| 2% | 0.4 | 1.1 | 45% |
| 2% | 0.8 | 2.6 | 37% |

From this table, it is seen that removal of vapor phase aldehydes is reduced when the pore diameter of the porous carrier is less than 0.1 microns and more than 2.0 microns.

PORE VOLUME

| Weight of Additive on alumina | Surface Area ($m^2$/gm) | Pore Volume (cc/gm) | Pore Diameter (microns) | Acetaldehyde % removed | Acrolein % removed |
|---|---|---|---|---|---|
| 5% | 1.1 | 0.2 | 0.8 | 56 | 48 |
| 5% | 1.1 | 0.4 | 1.1 | 67 | 78 |

As is seen from the results of the above tests, when pore volume is reduced below about 0.3 cc per gram then filtration efficiency for vapor phase aldehydes is undesirably reduced. Note that during the above tests, both the surface area and pore diameter of the substrate were maintained within permissible limits.

SURFACE AREA

| Weight of Additive on Alumina | Surface Area ($m^2$/gm) | Pore Volume (cc/gm) | Hydrogen Cyanide % removed | Acetaldehyde % removed |
|---|---|---|---|---|
| 2% | 63 | 0.4 | 77 | 28 |
| 2% | 4 | 0.4 | 86 | 43 |

From the above, it is seen that when the surface area of the porous carrier is greater than about 15 square meters per gram, then vapor phase filtration is adversely affected. Similar results are obtained below about 1 $m^2$/gm.

Similar filtration effects with respect to vapor phase components are noted when other porous carriers described herein are employed with the aforesaid physical characteristics.

COMPARATIVE EXAMPLE II

In order to further illustrate the enhanced selective filtration results obtained, a porous alumina, calcined at a temperature of 1300° Centigrade having a surface area of 1.1 square meters per gram, a pore volume of 0.4 cubic centimeters per gram and a pore diameter of 1.1 microns was employed. To a portion of the porous alumina was added 5 percent by weight poly(ethyleneimine), unbuffered. To another portion of the porous alumina was added 5% by weight poly(ethyleneimine) buffered with acetic acid to a pH of 7.4. Another portion of the calcined alumina was treated with 10 percent by weight poly(ethyleneimine) buffered with acetic acid. The resulting filter materials were formed into filters and tested for vapor phase efficiency according to Example I. The following results were obtained:

| Sample | Acetaldehyde % removed | Acrolein % removed |
|---|---|---|
| Untreated calcined alumina | 0 | 0 |
| 5% Additive unbuffered | 38 | 33 |
| 5% acetate buffered additive | 67 | 79 |
| 10% acetate buffered additive | 56 | 31 |

From the above table, it is seen that untreated porous alumina had no measurable effect on vapor phase deliveries. With unbuffered poly(ethyleneimine) (PEI) there is some reduction in vapor phase aldehydes. A substantial reduction in vapor phase aldehydes is obtained when a poly(alkyleneimine), buffered to a pH of from about 6 to 7.6 with an alkanoic acid, is employed on porous alumina substrate.

Filter material prepared from buffered PEI and deposited on conventional paper sections of dual paper-cellulose acetate filters was also tested for vapor phase component removal. It was found that only about 25 percent acetaldehyde was selectively removed from cigarette smoke employing the dispersed additive.

The synergism observed between the additive and the porous carrier illustrated hereinabove is obtained when other additives and porous substrates of the invention are employed in place of the buffered poly(ethyleneimine) additive deposited on the porous alumina substrate. As shown above, when the quantity of additive deposited on the porous carrier is adjusted above about 6 percent by weight, aldehydic reductions in tobacco smoke significantly decrease. It is postulated that the pores of the substrate become filled by the excess additive, thereby reducing the affinity of the filter material for the vapor phase components in tobacco smoke.

This invention is not to be limited except as set forth in the following claims.

Having thus described my invention, what is claimed is:

1. An improved tobacco smoke filter material comprising [ at least 100 mg. of ] a porous particulate carrier impregnated with a poly(alkyleneimine) alkanoate, wherein from about 2 to 6 percent by weight alkanoate is deposited on the carrier based on the total weight of the alkanoate and carrier, said poly(alkyleneimine) alkanoate having a pH from about 6.0 to 7.6, and wherein each of said carrier particles has a pore diameter of from about 0.1 to 2.0 microns, a surface area of from about 1 to 15 square meters per gram and a pore volume no less than about 0.3 cubic centimeter per gram.

[ 2. The invention in accordance with claim 1 in which the carrier is a porous alumina. ]

3. The tobacco smoke filter *material* of claim 1 wherein the pH of the poly(alkyleneimine) is buffered to about 7.4 with acetic acid.

4. An improved filter adapted to be affixed to a cigarette and comprising, in combination: a filter outer wrap having a tubular configuration and an inner filler formed from a plurality of particles formed from a porous particulate carrier impregnated with an alkanoic acid buffered poly(alkyleneimine) additive, said additive buffered to a pH from about 6.0 to 7.6, from about 2 to 6 percent by weight additive deposited on the carrier based on the total weight of carrier and additive, wherein from about 100 to 150 milligrams of filler are employed in said filter and wherein the carrier particles each have a pore diameter from about 0.1 to 2.0 microns, a surface area of from about 1 to 15 square meters per gram and a pore volume no less than about 0.3 cubic centimeter per gram.

5. An improved tobacco smoke filter material comprising [ at least 100 mg. of ] a porous particulate carrier impregnated with a poly(alkyleneimine) buffered with an alkanoic acid to a pH from about 6.0 to 7.6, wherein from about 2 to 6 percent by weight buffered poly(alkyleneimine) is deposited on the carrier based on the total weight of the buffered poly(alkyleneimine) and carrier and wherein the carrier particles each have a pore diameter from about 0.1 to 2.0 microns, a surface area of from about 1 to 15 square meters per gram and a pore volume no less than about 0.3 cubic centimeter per gram.

6. An improved tobacco smoke filter [ material ] adapted to be affixed to a cigarette and comprising: at least 100 milligrams of a porous alumina impregnated with poly(ethyleneimine) buffered to a pH of 7.4 with acetic acid, wherein the porous alumina has a pore diameter of from about 0.1 to 2.0 microns, a surface area of from about 1 to 15 square meters per gram, a pore volume of from 0.3 to 0.8 cubic centimeter per gram and wherein from about 4 to 6 percent by weight buffered poly(ethyleneimine) is deposited on the porous alumina.

7. An improved filter adapted to be affixed to a cigarette and comprising, in combination: a filter outer wrap having a tubular configuration and an inner filler formed from a plurality of particles formed from at least 100 milligrams of a porous particulate carrier impregnated with a poly(alkyleneimine) buffered with an alkanoic acid wherein from about 2 to 6 percent by weight acid buffered poly(alkyleneimine) is deposited on the carrier base on the total weight of the poly(alkyleneimine) and carrier, said poly(alkyleneimine) being buffered to a pH from about 6.0 to 7.6 and having an affinity for volatile smoke aldehydes and acids, wherein the carrier particles each have a pore diameter from about 0.1 to 2.0 microns, a surface area of from about 1 to 15 square meters per gram and a pore volume no less than about 0.3 cubic centimeter per gram.

8. The invention in accordance with claim 7 in which the carrier is a porous alumina.

9. The invention in accordance with claim 8 wherein the additive is poly(ethyleneimine) buffered to a pH of about 7.4 with acetic acid and wherein from 4 to 6 percent by weight of poly(ethyleneimine) is deposited on the porous alumina.

*10. An improved tobacco smoke filter material comprising a porous particulate alumina carrier impregnated with a poly(alkyleneimine) buffered with an alkanoic acid to a pH from about 6.0 to 7.6, wherein from about 2 to 6 percent by weight buffered poly(alkyleneimine) is deposited on the carrier based on the total weight of the buffered poly(alkyleneimine) and carrier and wherein the carrier particles each have a pore diameter from about 0.1 to 2.0 microns, a surface area of from about 1 to 15 square meters per gram and a pore volume no less than about 0.3 cubic centimeter per gram.*

*11. An improved tobacco smoke filter material comprising a porous particulate alumina carrier impregnated with a poly(alkyleneimine)alkanoate, wherein from about 2 to 6 percent by weight alkanoate is deposited on the carrier based on the total weight of the alkanoate and carrier, said poly(alkyleneimine) alkanoate having a pH from about 6.0 to 7.6, and wherein each of said carrier particles has a pore diameter of from about 0.1 to 2.0 microns, a surface area of from about 1 to 15 square meters per gram and a pore volume no less than about 0.3 cubic centimeter per gram.*

*12. An improved tobacco smoke filter material comprising a porous particulate alumina carrier impregnated with a poly(alkyleneimine) acetate wherein from about 2 to 6 percent by weight acetate is deposited on the carrier based on the total weight of the acetate and carrier, said poly(alkyleneimine) acetate having a pH from about 6.0 to 7.6, and wherein each of said carrier particles has a pore diameter of from about 0.1 to 2.0 microns, a surface area of from about 1 to 15 square meters per gram and a pore volume no less than about 0.3 cubic centimeter per gram.*

*13. An improved tobacco smoke filter material comprising a porous particulate alumina carrier impregnated with a poly(alkyleneimine) buffered with an acetic acid to a pH from about 6.0 to 7.6, wherein from about 2 to 6 percent by weight buffered poly(alkyleneimine) is deposited on the carrier based on the total weight of the buffered poly(alkyleneimine) and carrier and wherein the carrier particles each have a pore diameter from about 0.1 to 2.0 microns, a surface area of from about 1 to 15 square meters per gram and a pore volume no less than about 0.3 cubic centimeter per gram.*

* * * * *